(12) United States Patent
Sheridan

(10) Patent No.: US 7,305,411 B2
(45) Date of Patent: Dec. 4, 2007

(54) METHODS, SYSTEMS, AND STORAGE MEDIUMS FOR EXPANDING THE FUNCTIONALITY OF DATABASE APPLICATIONS

(75) Inventor: Phillip Sheridan, Marietta, GA (US)

(73) Assignee: AT&T BLS Intellectual Property, Inc., Wilmington, DE (US)

( * ) Notice: Subject to any disclaimer, the term of this patent is extended or adjusted under 35 U.S.C. 154(b) by 514 days.

(21) Appl. No.: 10/857,274

(22) Filed: May 28, 2004

(65) Prior Publication Data

US 2005/0278282 A1    Dec. 15, 2005

(51) Int. Cl.
*G06F 7/00* (2006.01)
(52) U.S. Cl. .................. 707/102; 707/104.1; 715/506
(58) Field of Classification Search ................ 707/102, 707/104.1; 715/505–507
See application file for complete search history.

(56) References Cited

U.S. PATENT DOCUMENTS

| 7,003,560 | B1* | 2/2006 | Mullen et al. | 709/223 |
| 2003/0182303 | A1* | 9/2003 | Gibson | 707/102 |
| 2004/0117731 | A1* | 6/2004 | Blyashov | 715/507 |
| 2005/0039033 | A1* | 2/2005 | Meyers et al. | 713/193 |

* cited by examiner

*Primary Examiner*—Don Wong
*Assistant Examiner*—Robert M Timblin
(74) *Attorney, Agent, or Firm*—Cantor Colburn LLP

(57) ABSTRACT

Exemplary embodiments include methods, systems, and storage mediums for expanding the functionality of a database application via a computer system. The method includes importing an application development system for expanding the functionality of a database application into a database created using the database application. The database includes records arranged in a predetermined manner. The method also includes presenting prompts to a user to facilitate selection of records from the database, modification, and arrangement of the records, and creating a customized form or report based upon responses to the prompts. The customized form or report includes records from the database that have been selected, modified, and arranged according to the responses.

15 Claims, 21 Drawing Sheets

FIG. 4B

Form and Report Wizard — 400B

Work with either: ⊙ Tables  ○ Queries

Select a Table: [tblEmpl ▽]  — 404

| Data Dict | Select Fields |

| Column Head Label | Print Width (In.) | Print Align-ment | Print During Edit? | Reqd. | Data Source | If Data Source=Combo Box— Query/Table Name | If Data Source=Combo Box— Table/Query Field Name | If Data Source =Combo Box— Value List Field Values | Origin |
|---|---|---|---|---|---|---|---|---|---|
| CreatedDate | 0.6 | ▷ | ☐ | ☐ | System | ▷ | ▷ | ▷ | Today's Date |
| DeptName | 1.2 | ▷ | ☑ | ☐ | Combo—Table/Q | ▷ tblDept | ▷ DeptName | ▷ | |
| act? | 0.6 | ▷ | ☐ | ☐ | Keyed | ▷ | ▷ | ▷ | |
| mpl ID | 0.5 | ▷ | ☐ | ☐ | Keyed | ▷ | ▷ | ▷ PCE,NT,Oth | |
| mplLocn | 1.0 | ▷ | ☐ | ☐ | Combo—Value List | ▷ | ▷ | ▷ | |
| mpl Name | 1.5 | ▷ | ☐ | ☐ | Keyed | ▷ | ▷ | ▷ | |
| | 0.0 | | | | | | | | |

414  416  417  418  420  422  424  426  428

Form View | Start tblEmpl Summary

4/27/2004

Page 1 of 1

| Empl ID | Empl Name | Active? | Empl Locn | Dept Name |
|---|---|---|---|---|
| 1 | Smith, Mary | ☐ | PCE | Dev |
| 2 | Johnson, Samuel | ☑ | | Marketing |
| 3 | Baldwin, Joseph | ☑ | | HR |
| 4 | Johnson, Jim | ☐ | NT | Dev |
| 6 | Smith, Bill | | | |

5 Records Displayed

FIG. 9

Employee List

4/27/2004

Page 1 of 2

Empl ID: 1
Empl Name: Smith, Mary
Active?: ☐
Empl Locn: NT
DeptName: Dev

Empl ID: 2
Empl Name: Johnson, Samuel
Active?: ☐
Empl Locn:
DeptName: Marketing

Empl ID: 3
Empl Name: Baldwin, Joseph
Active?: ☑
Empl Locn:
DeptName: HR

METHODS, SYSTEMS, AND STORAGE MEDIUMS FOR EXPANDING THE FUNCTIONALITY OF DATABASE APPLICATIONS

BACKGROUND OF INVENTION

The present invention relates generally to data processing applications, and more particularly, to methods, systems, and storage mediums for expanding the functionality of database applications.

Existing database applications enable users to create databases, as well as forms and reports that utilize the data in these databases. The types of forms and reports desired by a database application user vary significantly from business to business in accordance with the nature of the business and its individual needs. Many users find that these applications provide limited functionality in that they were designed to handle broad-based functions that are common to most enterprises. If a business requires additional functionality, it tends to hire outside developers to build customized database systems. This option can be prohibitively expensive for smaller businesses.

What is needed, therefore, is a way to provide database application users with the expanded functionality desired to design and utilize customized forms and reporting features.

SUMMARY OF INVENTION

The above stated disadvantages are overcome or alleviated by methods, systems, and storage mediums for expanding the functionality of database applications. Methods include importing an application development system for expanding the functionality of a database application into a database created using the database application. The database includes records arranged in a predetermined manner. The methods also include presenting prompts to a user to facilitate selection of records from the database, modification, and arrangement of the records, and creating a customized form or report based upon responses to the prompts. The customized form or report includes records from the database that have been selected, modified, and arranged according to the responses.

Systems for expanding the functionality of database applications include a database application interface for interfacing with the database application, and an application development system for expanding the functionality of a database application. The application development system is imported, via the database application interface, into a database created using the database application and includes records arranged in a predetermined manner. Systems also include a user interface for presenting prompts to a user to facilitate selection of records from the database, modification of the records, and arrangement of the records. Systems further include a report generator for presenting a customized form or report based on responses to the prompts. The customized form or report includes records from the database selected, modified, and arranged according to responses to the prompts.

Other systems, methods, and/or computer program products according to embodiments will be or become apparent to one with skill in the art upon review of the following drawings and detailed description. It is intended that all such additional systems, methods, and/or computer program products be included within this description, be within the scope of the present invention, and be protected by the accompanying claims.

BRIEF DESCRIPTION OF DRAWINGS

Referring now to the drawings wherein like elements are numbered alike in the several FIGURES:

FIGS. 4A and 4B illustrate left and right portions of a computer screen window provided by the application development system which displays the data dictionary component of the application development system in exemplary embodiments;

FIG. 9 is a computer screen window provided by the application development system illustrating a sample continuous report created via the computer screen window of FIGS. 8A-B in exemplary embodiments;

FIG. 13 is a computer screen window provided by the application development system illustrating a sample single report created via the computer screen window of FIG. 12 in exemplary embodiments;

DETAILED DESCRIPTION

The application development system enables database application users to customize their database applications by providing an interface to an existing database application and expanding its functionality in a way that is convenient and easy to implement. The application development system is imported into a database that was created using an existing database application. The application development system then prompts the user to select a table from a list of tables associated with the database and provides assistance in creating new forms and reports for the database, including various searching, sorting, and filtering options.

Figure 1:
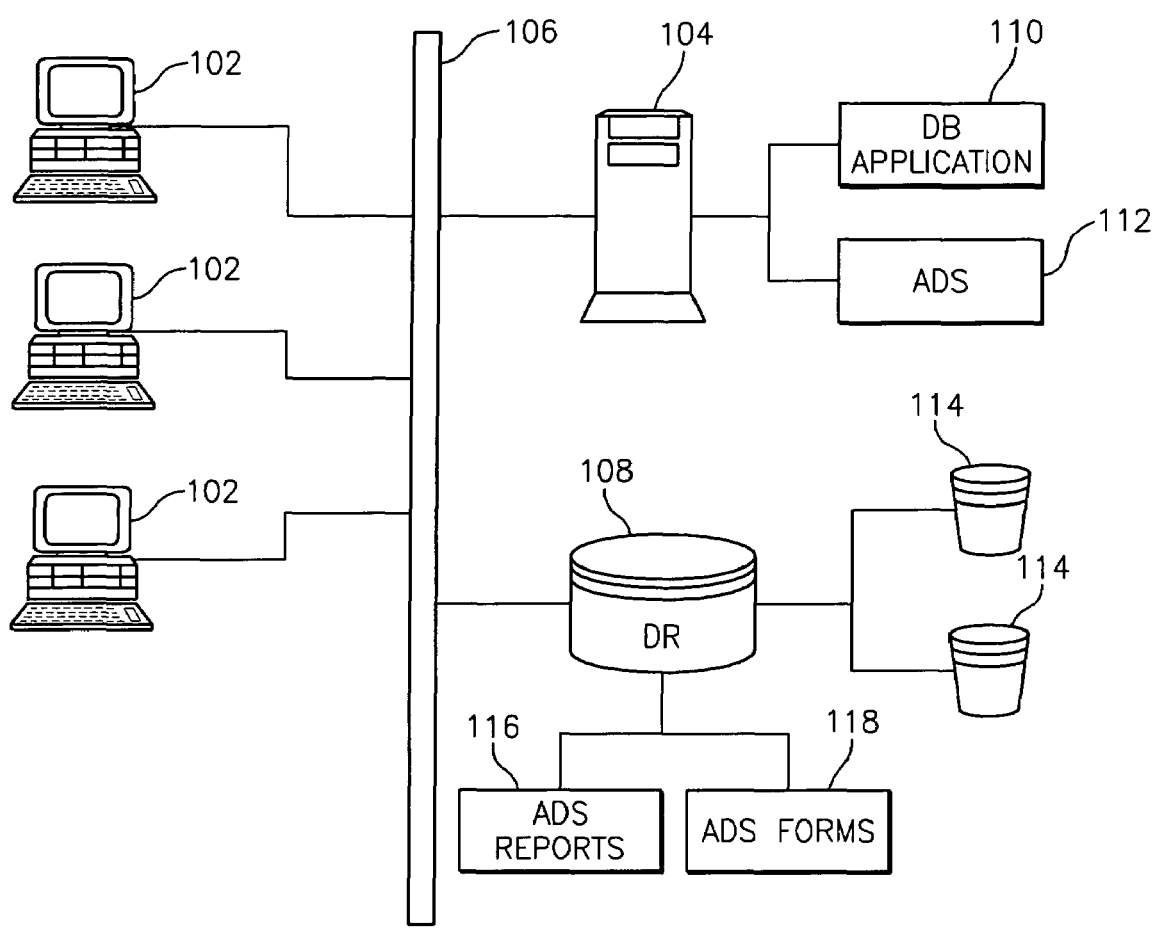
FIG. 1 is a system upon which the application development system may be implemented in exemplary embodiments.

Referring now to FIG. 1, a system upon which the application development system may be implemented will now be described. The system of FIG. 1 includes user systems 102 through which an application development system user contacts a host system 104. In exemplary embodiments, the host system 104 executes a program included in the application development system for providing expanded functionality to the database application 110. The user systems 102 are coupled to a host system 104 via a network 106. Each user system 102 may be implemented using a general-purpose computer executing a computer program for carrying out the processes described herein. The user systems 102 may be personal computers or host attached terminals. If the user systems 102 are personal computers, the processing described herein may be shared by user system 102 and host system 104. This processing may be shared by providing an applet to the user system 102 or in any other manner that is known in the art.

Network 106 may be any type of known network including a local area network (LAN), a wide area network (WAN), or a global network (e.g., Internet). The user system 102 may be coupled to the host system 104 through multiple networks (e.g., intranet and Internet) so that not all user systems 102 are coupled to the host system 104 through the same network. One or more of the user systems 102 and the host system 104 may be connected to network 106 in a wireless fashion and network 106 may be a wireless network. In exemplary embodiments, network 106 is an intranet.

The host system 104 may be implemented using a server operating in response to a computer program stored in a storage medium accessible by the server. Host system 104 executes a database application 110 and a program in the application development system 112 for providing expanded functionality to the database application 110. Database application 110 may comprise a commercial software program such as Microsoft® Access or other similar type of database application. Application development system 112 includes program code for interfacing with database application 110 in order to perform the requisite functions described herein. Program code utilized for this purpose may be Microsoft® Visual Basic or other type of application development software. The host system 104 handles sending and receiving information to and from user systems 102 and can perform associated tasks. Host system 104 is in communication with data repository 108 as shown in FIG. 1. Host system 104 accesses databases 114 in response to requests by user systems 102 for data stored therein. In exemplary embodiments of the invention, databases 114 are relational databases. Databases 114 are created via database application 110 and stored in data repository 08 and/or one or more of user systems 102. While only two databases 114 are shown, it will be understood by those skilled in the art that any number of databases may be utilized by host system 104 and user systems 102. Reports 116 and forms 118 refer to output files created via the application development system 112 as described further herein. Reports 116 and forms 118 may be stored in data repository 108 and/or one or more of user systems 102 and may be accessible to application development system users through user systems 102.

Data repository 108 may be implemented using a variety of devices for storing electronic information such as a file transfer protocol (FTP) server. It is understood that data repository 108 may be implemented using memory contained in a host system 104 or may be a separate physical device connected to host system 104. If the data repository 108 is a separate physical device, it may be connected to the host system 104 in any manner known in the art including both direct and network connections. Data repository 108 stores a variety of information including databases 114, report files 116, and form files 118. Data repository 108 may also contain information concerning the submission of a report request.

In alternate embodiments, a single computer system 102 may store and execute database application 110 and application development system 112. Thus, it is not necessary that application development system 112 be implemented in a network computer environment.

Figure 2:
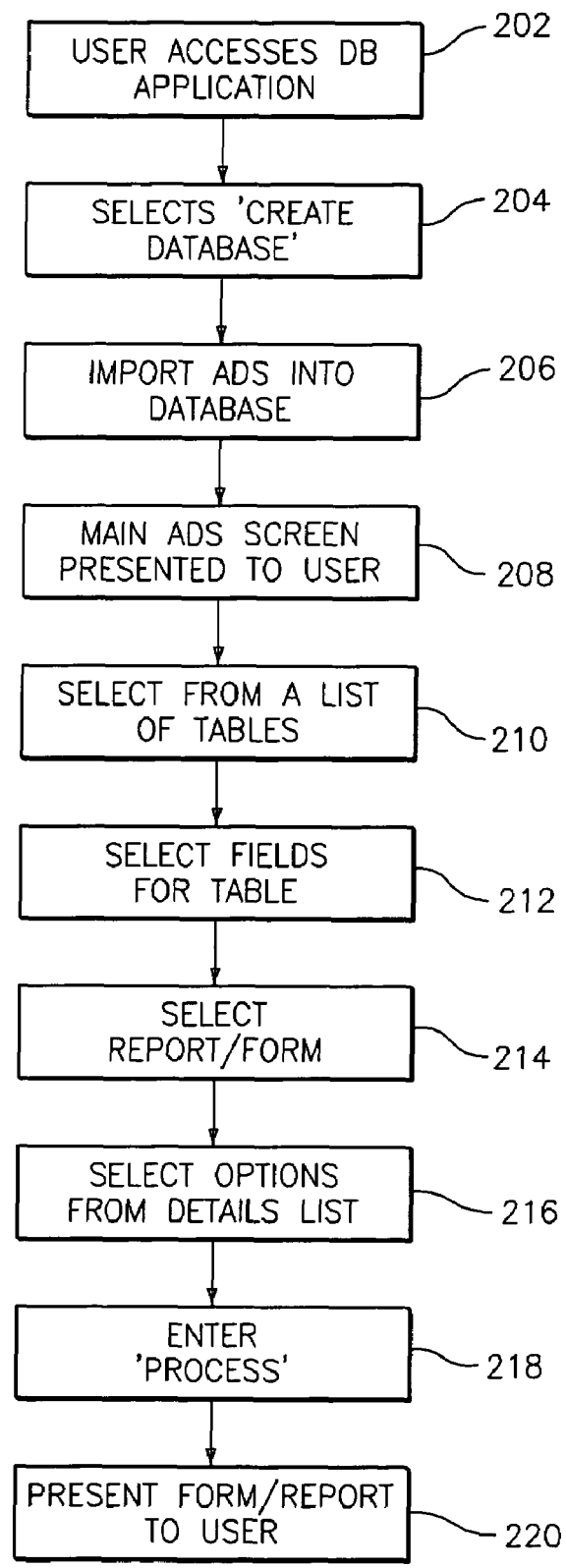
FIG. 2 is a flowchart describing a process for implementing the application development system in exemplary embodiments.
Figure 3A:
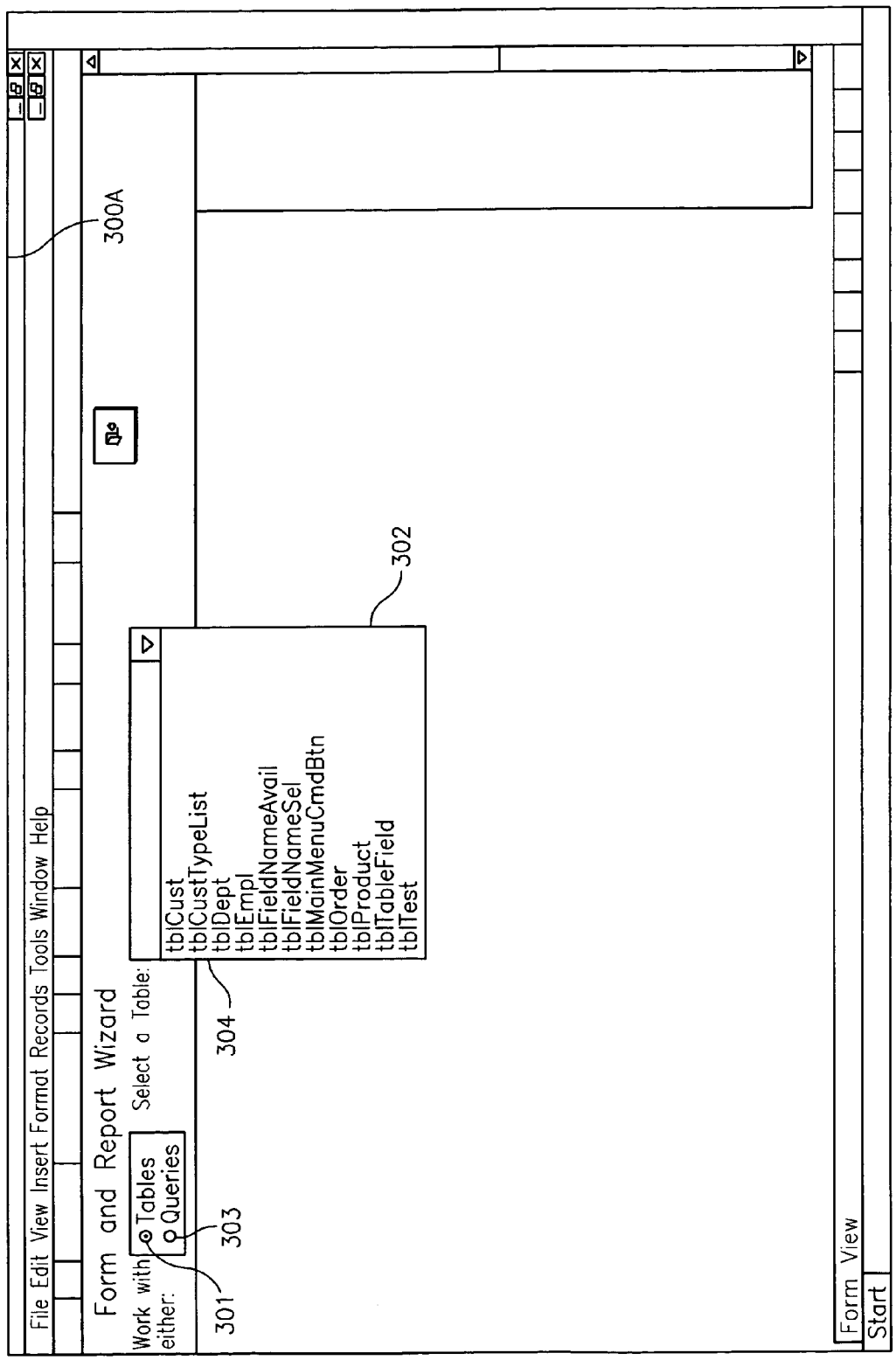
FIG. 3A is a computer screen window provided by the application development system illustrating a sample listing of available tables for selection in exemplary embodiments.
Figure 3B:
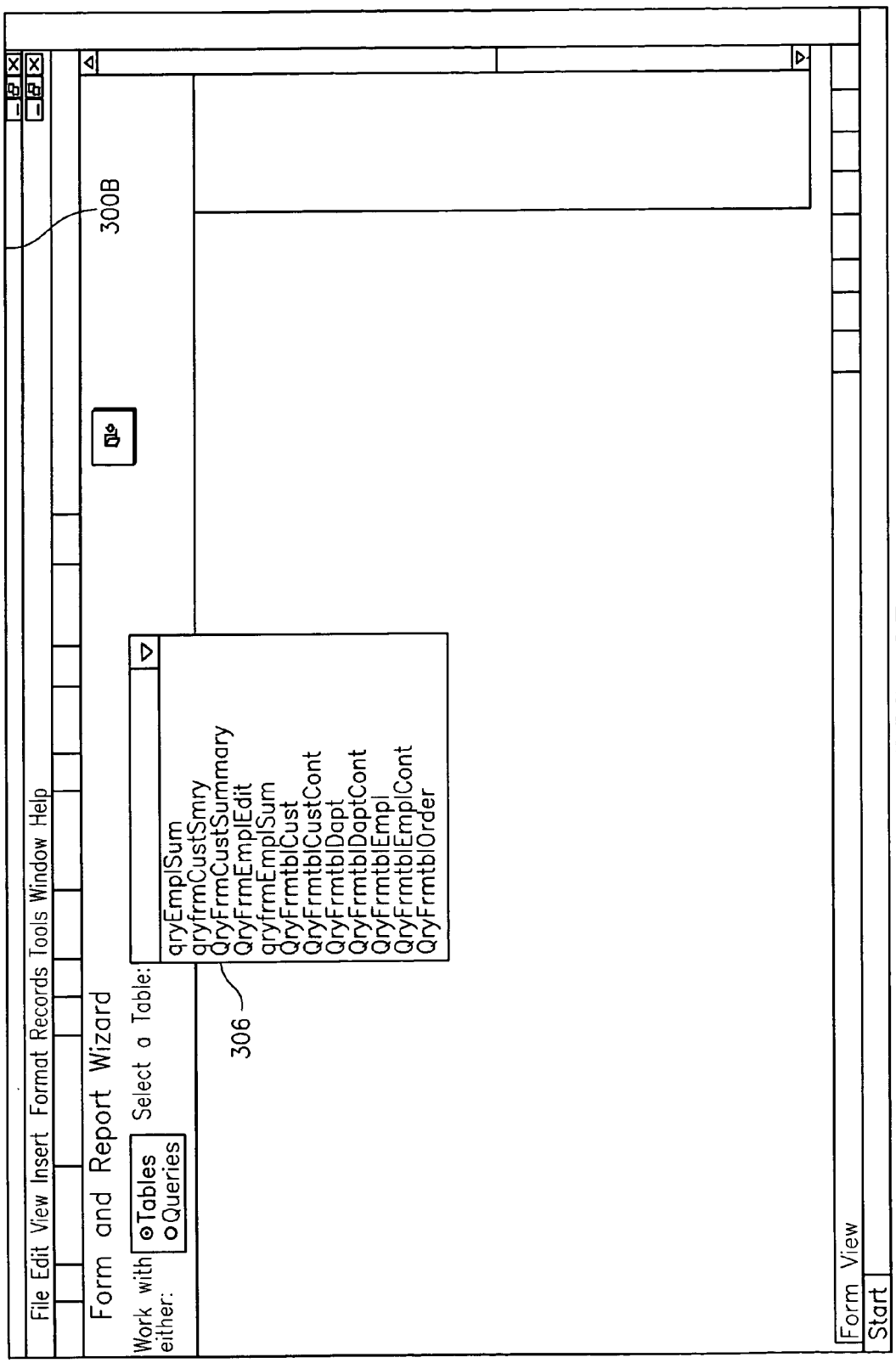
FIG. 3B is a computer screen window provided by the application development system illustrating a sample listing of available queries for selection in exemplary embodiments.

A process for implementing the application development system 112 will now be described with reference to FIG. 2. At step 202, a user accesses database application 110 from one of user systems 102. The user selects an option from database application 110 for creating a database (e.g., 114) including user-defined tables at step 204 followed by importing the application development system 112 into the newly created database 114 resident on user system 102 at step 206. This step need only be performed once for each user system 102. Once the application development system 112 has been imported, instructions are provided at step 208 that prompt the user to a main computer screen window represented by table screen window 300A in FIG. 3A and query screen window 300B in FIG. 3B. A user may select the name of an existing table or query and provide data on the fields in that table or query. The user selects the tables radio button 301 in order to work on an existing table (see generally FIG. 3A) and the queries radio button 303 in order to work on an existing query (see generally FIG. 3B); both buttons are illustrated in FIG. 3A.

Figure 4A:
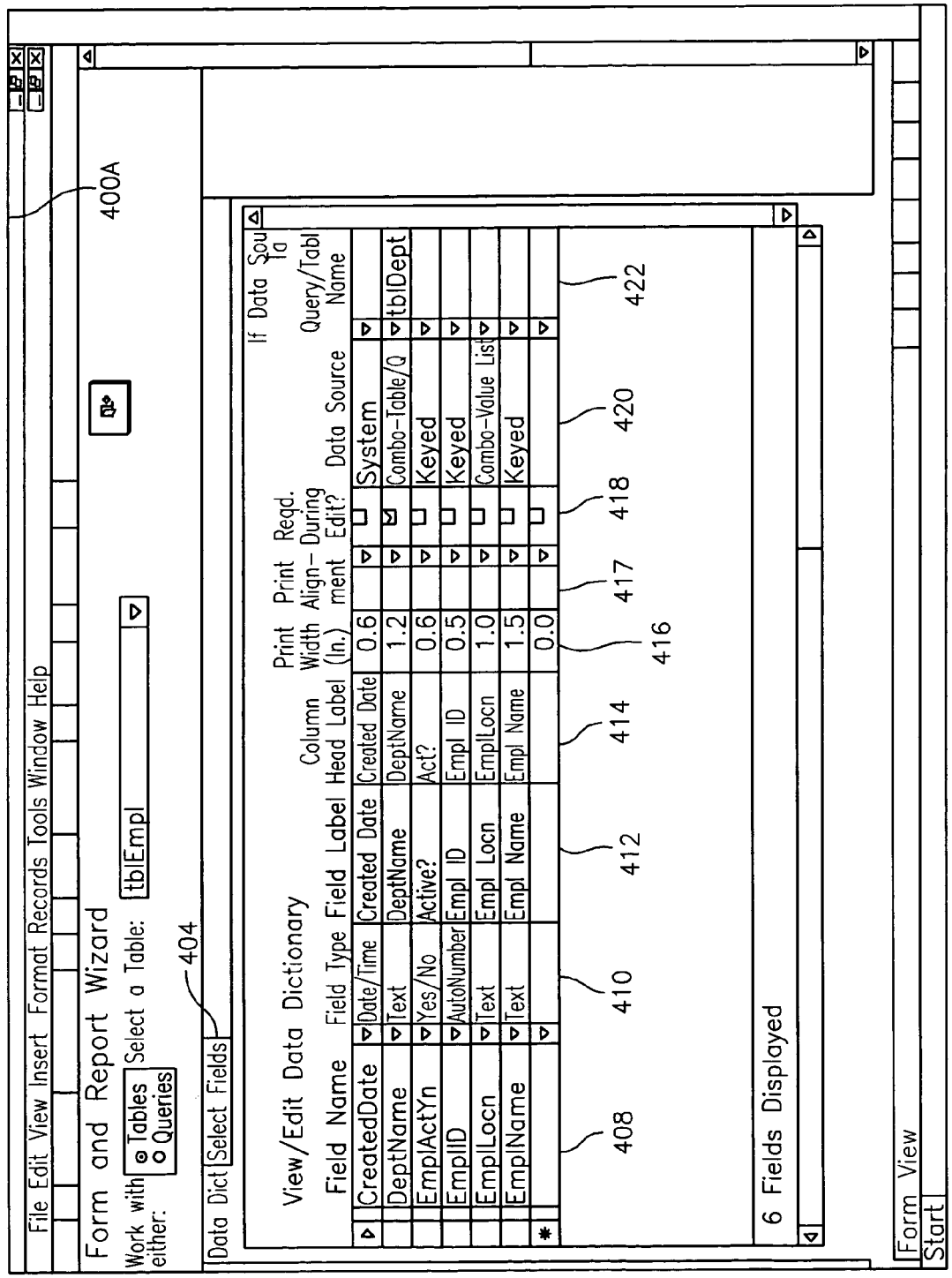

For purposes of illustration, the user selects the tables radio button 301. A drop down list 302 of available tables (or queries as shown in drop down list 306, if the user selects the queries radio button 303) is presented to the user system 102 at step 210. This listing of tables represents existing tables that were previously created using database application 110. The user is prompted to select from the list 302. For purposes of illustration, the user has selected the table, 'tblEmpl' 304. Once a table has been selected, the application development system 112 presents a computer screen window 400A-B of FIGS. 4A-B, which directs the user to the data dictionary feature of the application development system 112. The data dictionary feature provides all of the fields that were previously entered for the selected table 304. However, these fields can be modified via application development system 112 to allow the user to provide additional descriptive information. The data dictionary feature of application development system 112 creates a data dictionary computer screen window (e.g., 400A-B) for the table 304 and populates it with one row for each field defined for that table 304. Screen 400A illustrates the left side of the data dictionary screen as displayed on user system 102, and screen 400B illustrates the right side of the data dictionary screen. The names of the available fields for tblEmpl 304 are shown in column 408.

Each row in data dictionary screen window 400A-B includes several properties that indicate how the application development system 112 displays and treats each field on a form/report that is created. Sample properties are presented in columns 410-428. 'Field name' 408 is preferably a non-editable field that specifies the name assigned to the field at the time the table or query was created. 'Field type' 410 indicates the data type assigned to the field (e.g., text, autoNumber, date/time, yes/no, etc.) and is also preferably non-editable. 'Field label' 412 refers to a user-specified label (e.g., "customer number", "entry date", "active") that may be used by the application development system 112 to identify the field on a single form or report. 'Column head' label 414 refers to a label that may be used to identify a field on a continuous form or report. 'Print width' 416 specifies the width in inches that may be allocated for the value of a field on a form or report. 'Print alignment' 417 specifies the justification of the value of the field (e.g., left, centered, right). 'Required during edit' 418 may be used when a form is created that allows the user to key new records into the table or query. The user indicates whether this field must have a value when the record is added or updated. If the user attempts to save a record and the value is null, an error message may be displayed and the save operation stopped.

Data source 420 may be used if a user is creating either a continuous or single form, which allows the user to create or edit records. The data source choice informs the application development system 112 how the value for the field is determined. Choices available for data sources include 'keyed', 'combo box table/query', 'combo box—value list', and 'system.' For example, if the user enters 'keyed', this indicates that the user will key in the entry, such as a name or date. If the data source is 'combo box table/query', the user selects a value from a pull-down (combo) box, which is populated by the values from a field in a different table. For example, the value of a field, Sales Region, might be selected from a field 'SalesRegionID' in a table, 'tablSales-RegionList'. Thus, the user enters the name of the table (existing or future), containing the field used to populate the pull-down box, in query/table name column 422. The user may also specify the name of the field (existing or future), in the specified table, which may be used to populate the pull-down box, in field name column 424.

If the data source is 'combo box—value list', the user selects a value from a 'hardcoded' list of values (e.g., the value of sales region might be selected from the list: East, West, South, and North. The user specifies the field values separated by a comma in field values column 426. If the data source is 'system', the value of this field is controlled by the application; it is not editable by the user. On a form where record 'adds' are allowed, this field may be locked and its background color set to gray. A user may specify that the system will set to any of these values: today's date, current date/time, current user's name, autoNumber, or no value. These values are entered in origin column 428.

Figure 5:
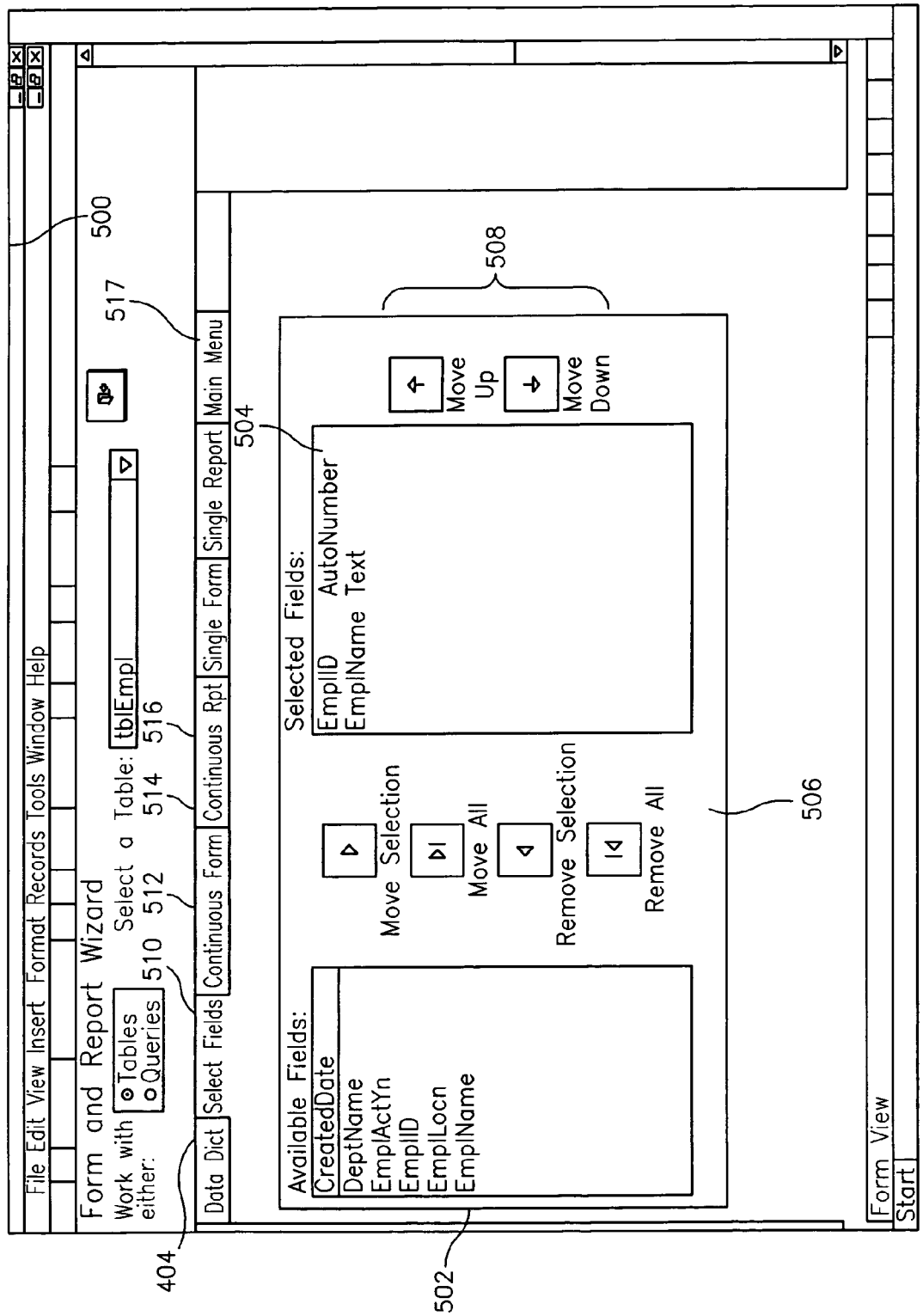
FIG. 5 is a computer screen window provided by the application development system illustrating available fields selectable for a given table in exemplary embodiments.

Once completed, the user then clicks on the 'select fields' tab 404 and the computer screen window 500 of FIG. 5 is presented to user system 102 at step 212. Window 500 displays a subwindow 502 listing all of the available fields for the table and a 'selected fields' subwindow 504. The user is prompted to select one or more fields from subwindow 502 which are then placed in subwindow 504 at step 212. This selection process is facilitated via the move options 506 located between subwindows 502 and 504. Options 508 enable the user to rearrange the order in which the selected fields in subwindow 504 will be displayed on a report or form.

Figure 6A:
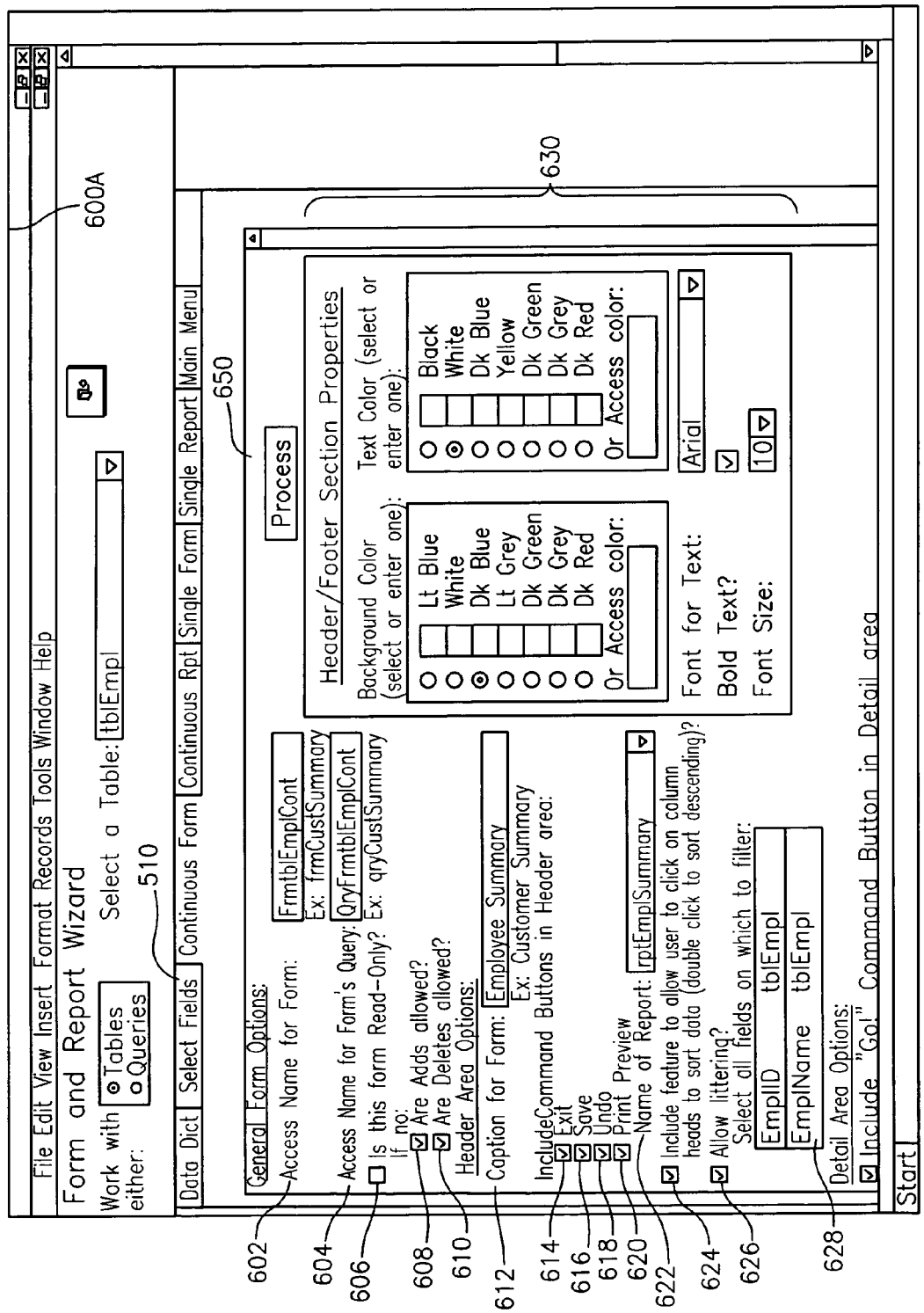
FIGS. 6A and 6B illustrate upper and lower portions of a computer screen window provided by the application development system which displays options available for designing a continuous form in exemplary embodiments.
Figure 6B:
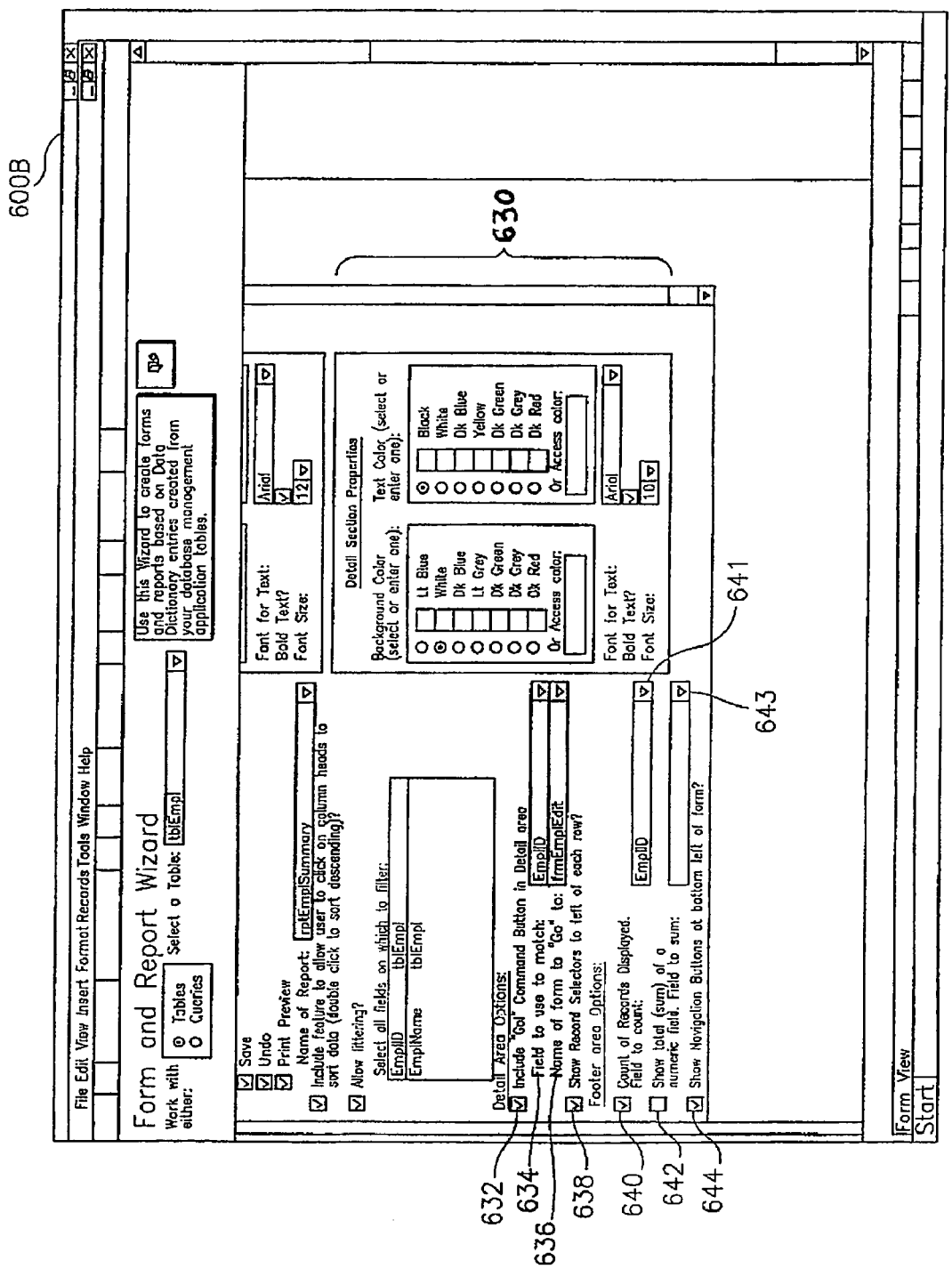
Figure 8A:
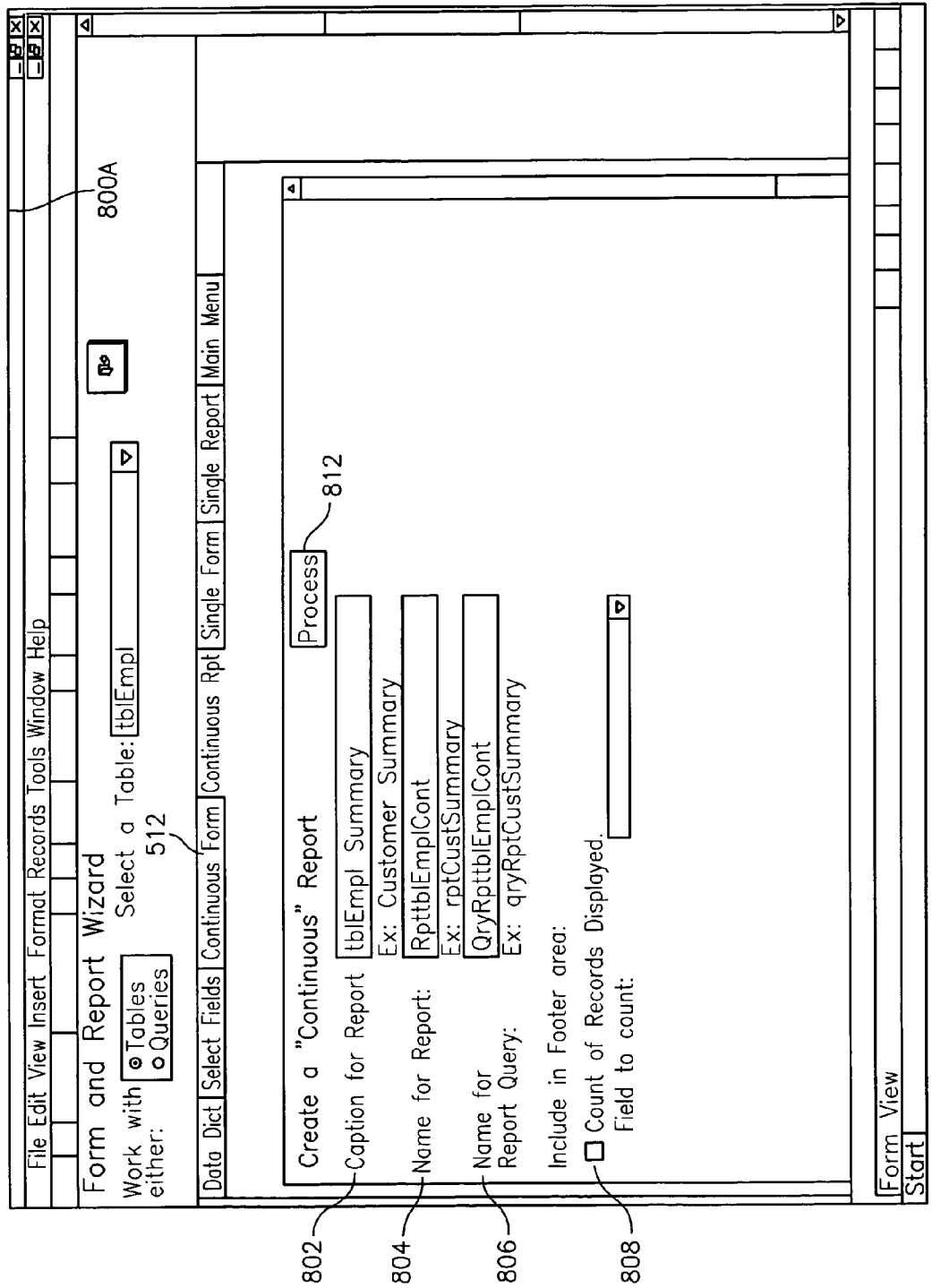
FIGS. 8A and 8B illustrate upper and lower portions of a computer screen window provided by the application development system which display options available for designing a continuous report in exemplary embodiments.
Figure 8B:
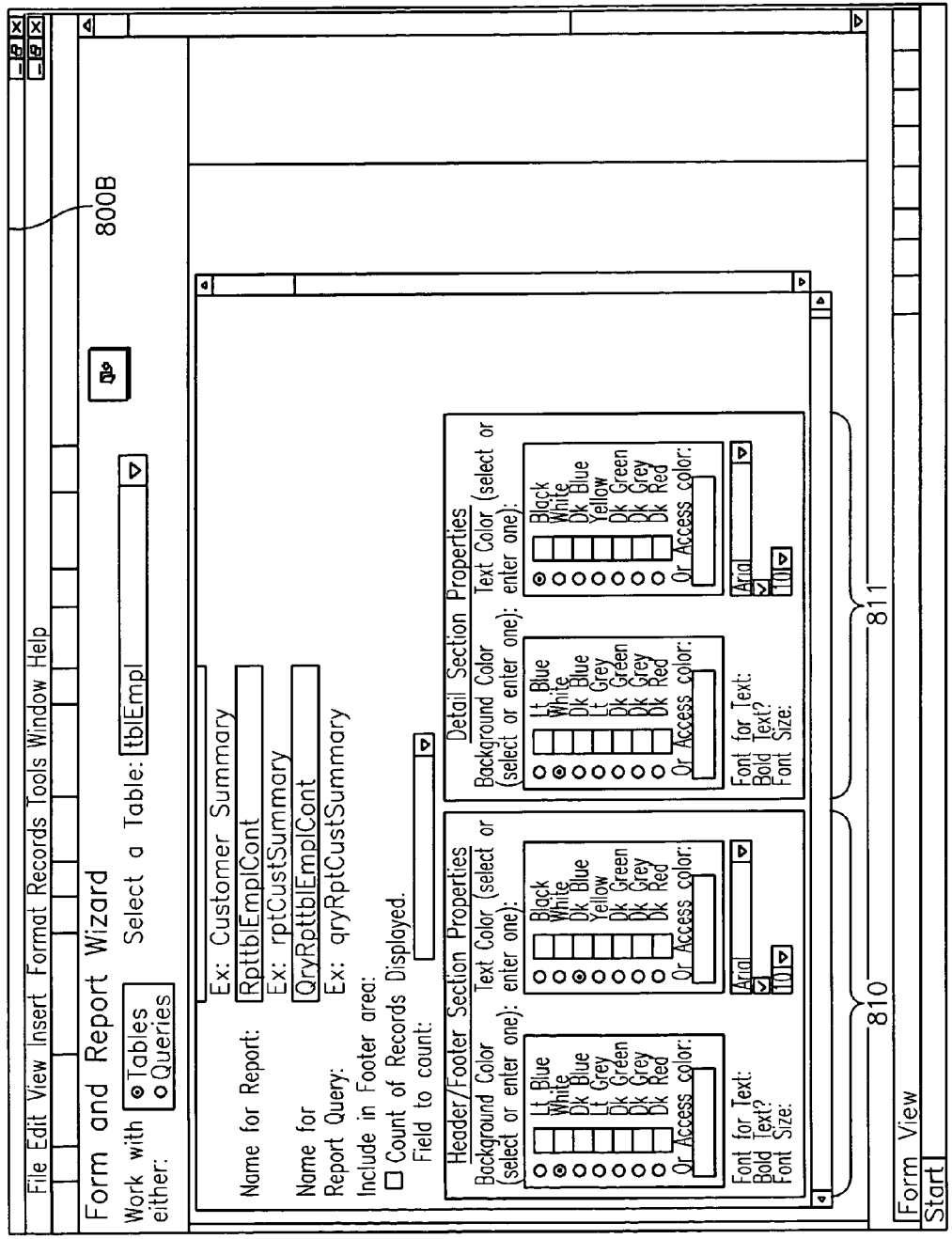
Figure 10A:
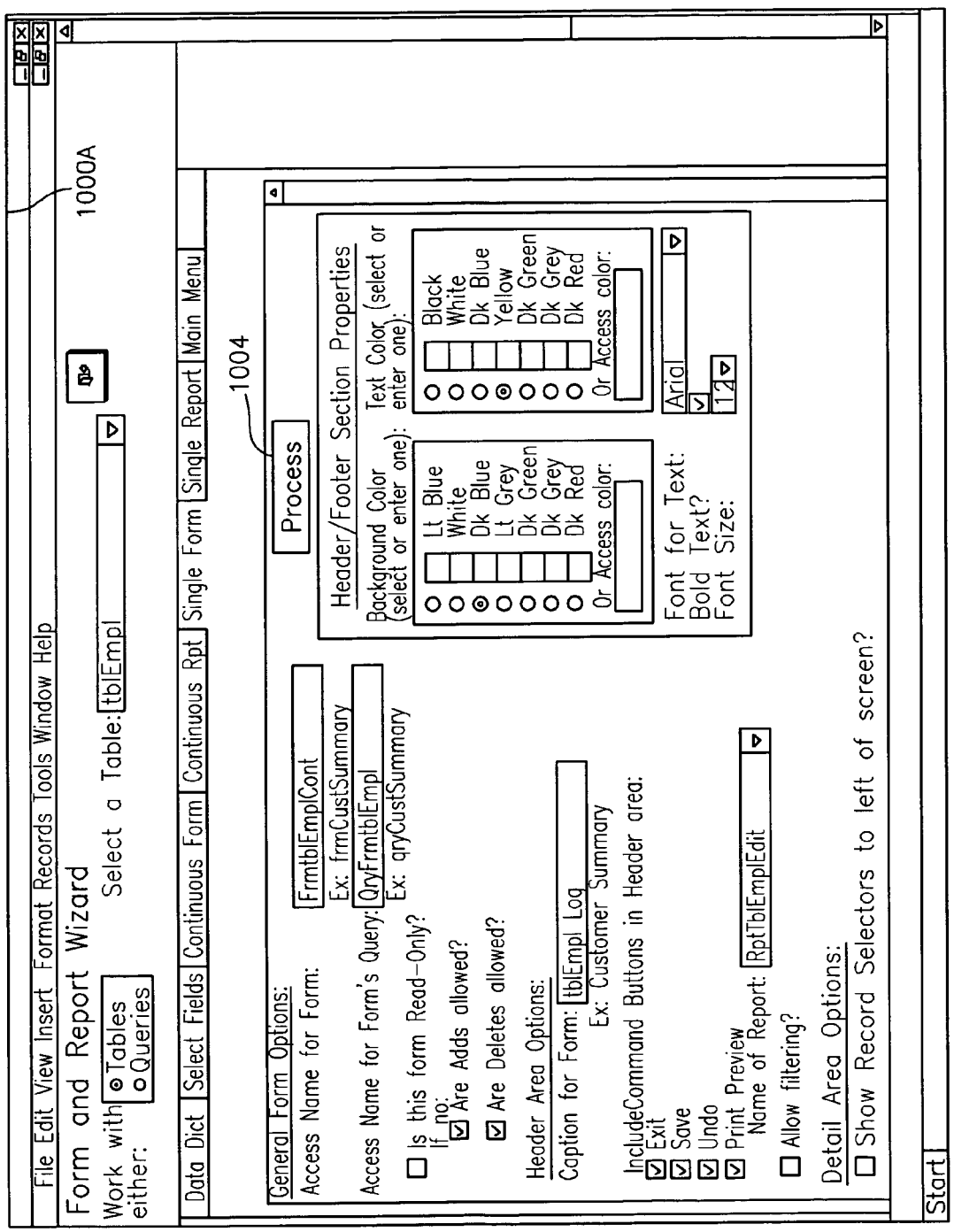
FIGS. 10A and 10B illustrate upper and lower portions of a computer screen window provided by the application development system which displays options available for designing a single form in exemplary embodiments.
Figure 10B:
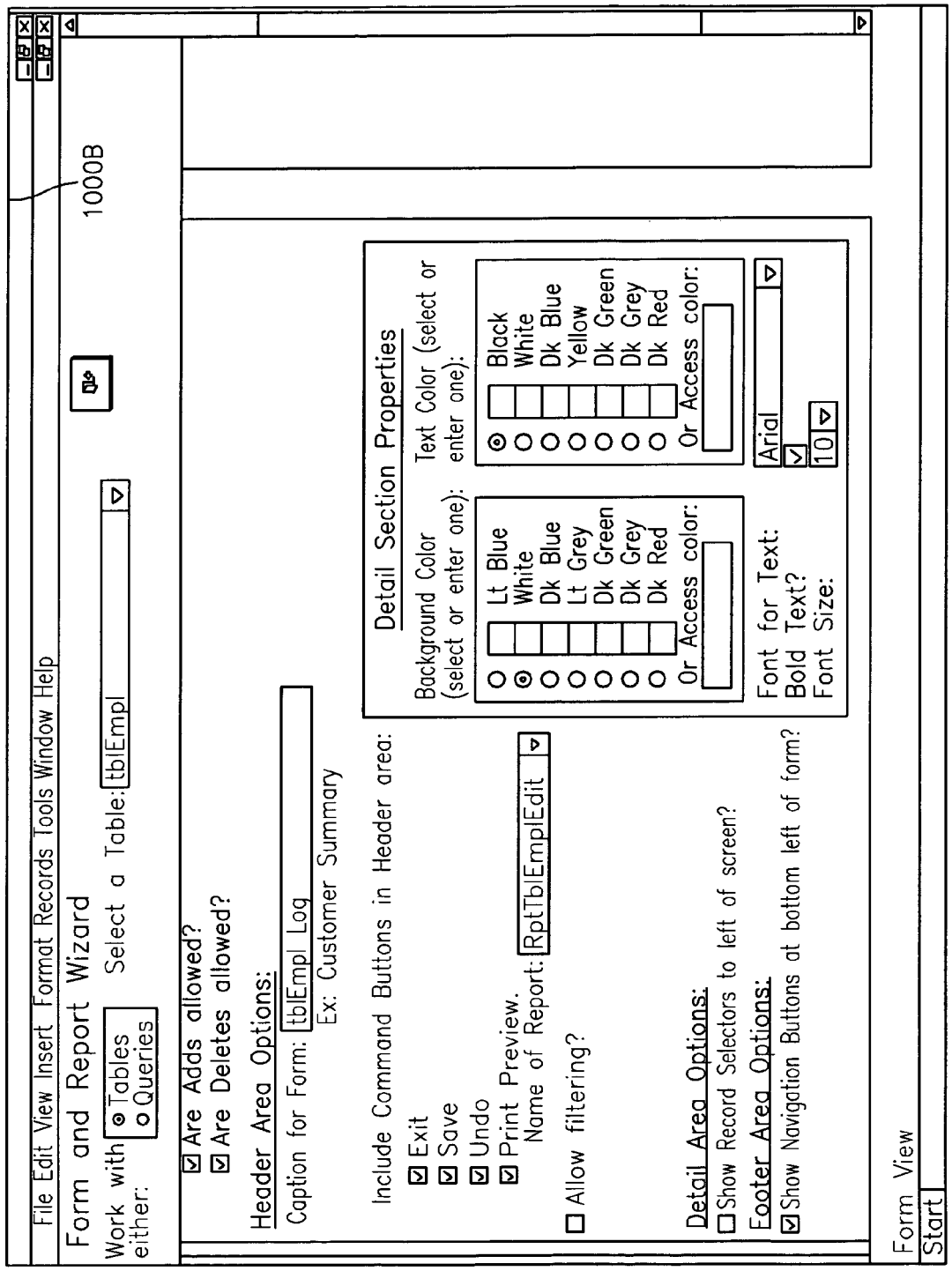
Figure 12:
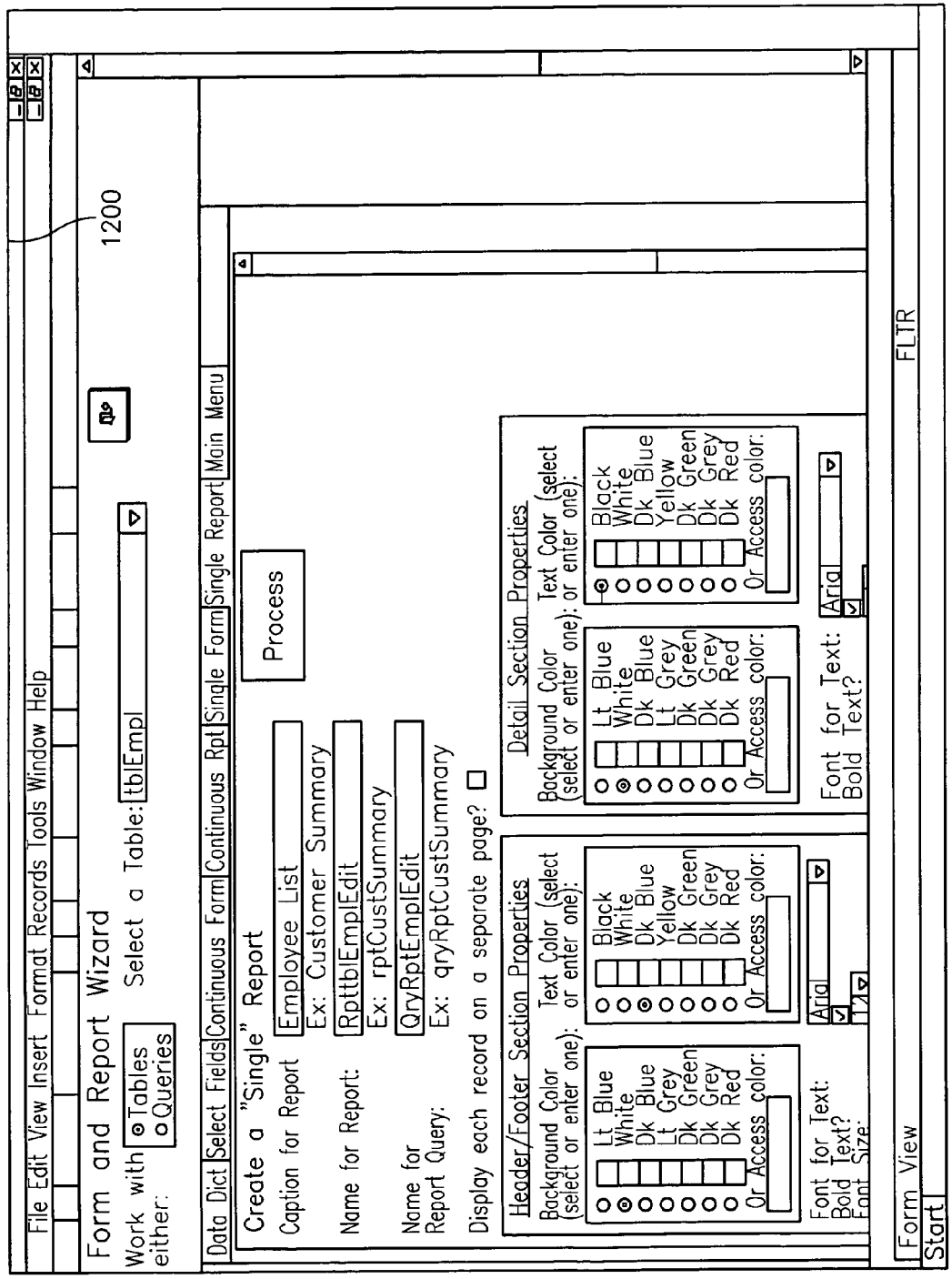
FIG. 12 is a computer screen window provided by the application development system illustrating selections available for designing a single report in exemplary embodiments.
Figure 14A:
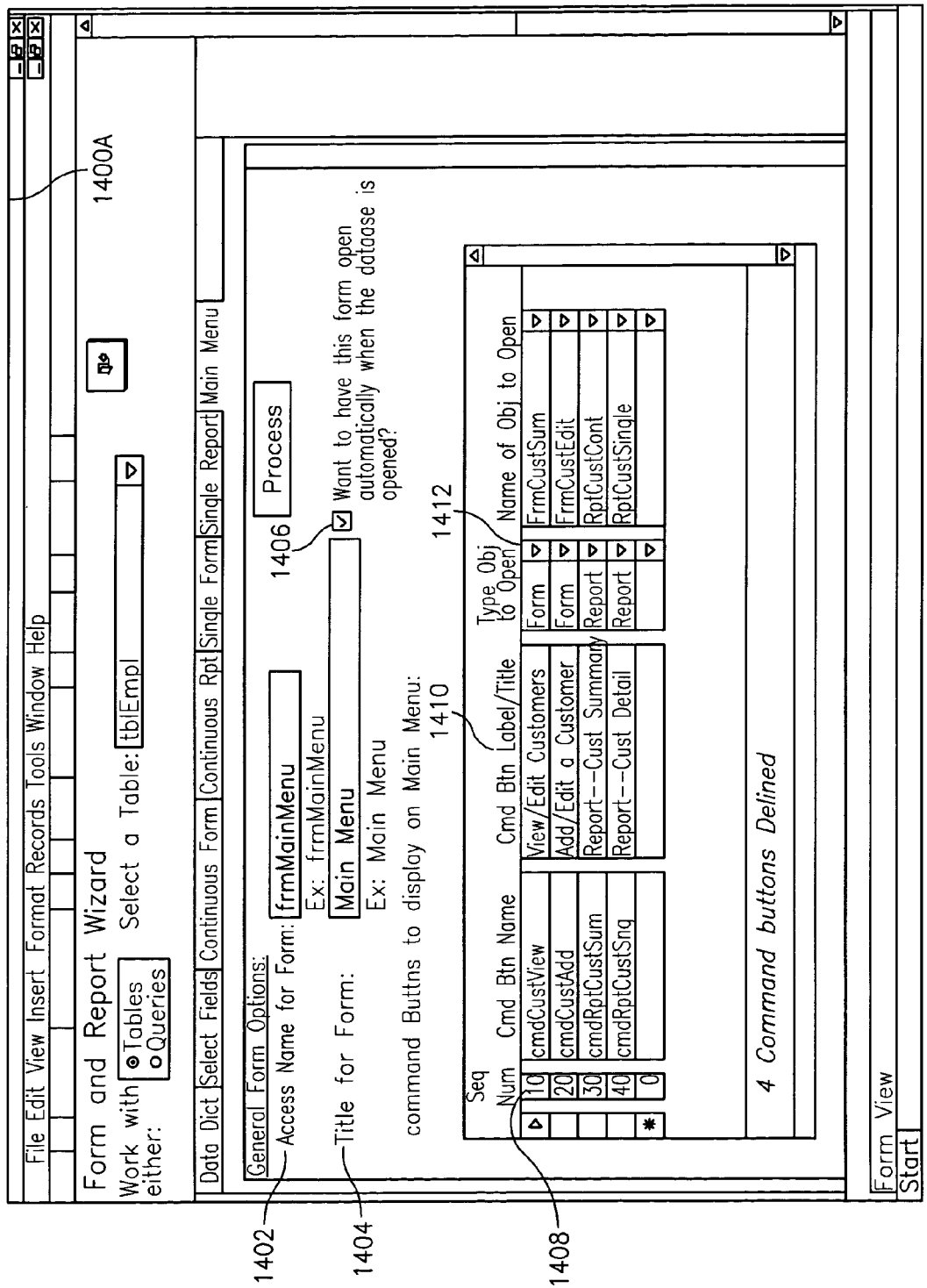
FIGS. 14A and 14B illustrate upper and lower portions 1400A and 1400B respectively of a computer screen window provided by the application development system which display options available for designing a main menu form in exemplary embodiments.
Figure 14B:
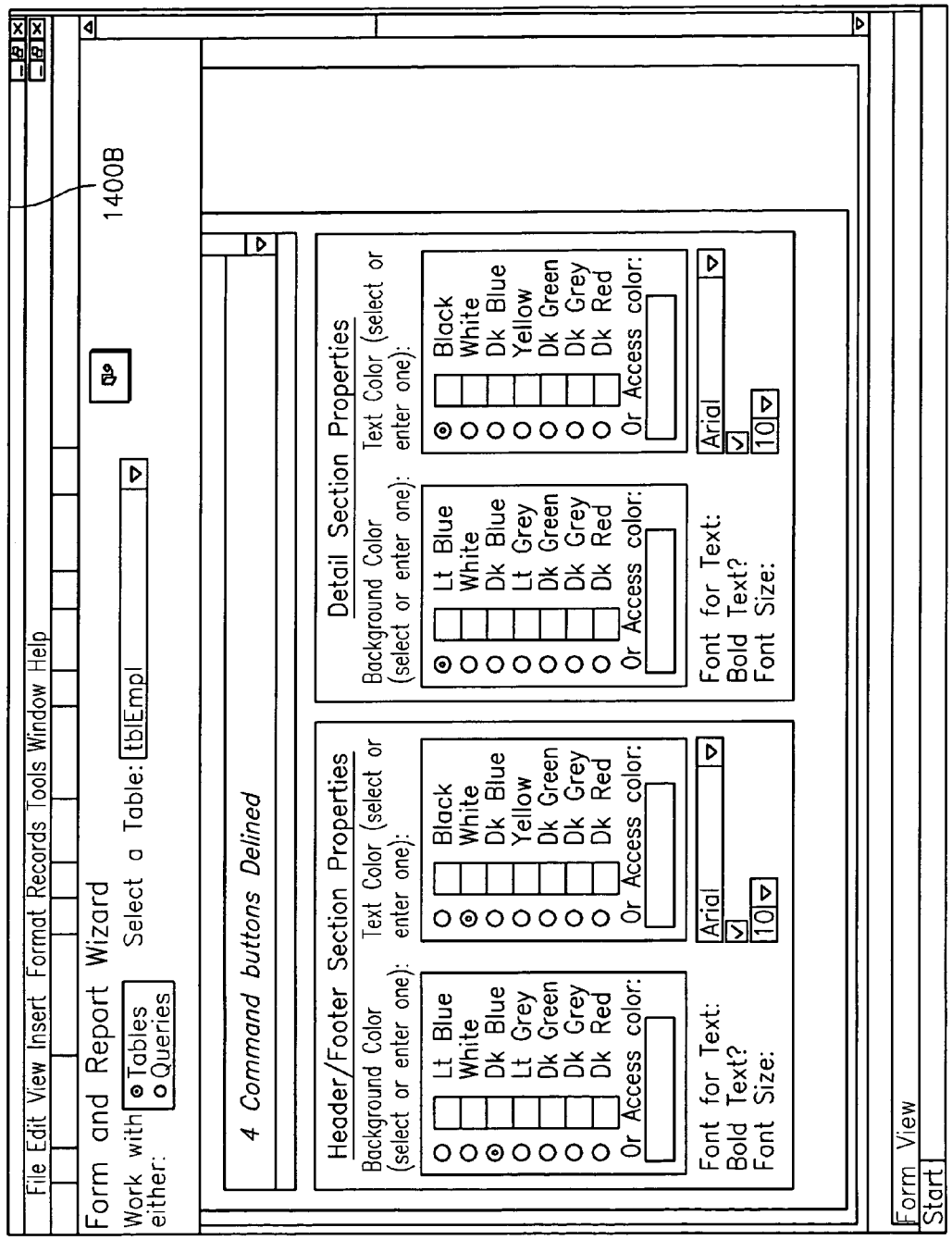

The user then selects from a choice of creating a form or a report for the database 114 at step 214. Available options include a continuous form, a single form, a continuous report, a single report, and a main menu form. These choices may be made by selecting one of tabs 510-517. A continuous form/report may include multiple entries while a single form/report may include only one entry. For example, if a form is directed to employees of a business, a continuous form might include records for all of the employees. A continuous form may be configured as read-only or may be set to allow additions, edits, and deletes as described further herein. A single form, on the other hand, would be directed to a single employee. If the user selects 'continuous form' tab 510, the application development system 112 displays computer screen windows 600A-B as shown in FIGS. 6A-B. If the user selects 'continuous report' tab 512, the application development system displays computer screen windows as shown in FIGS. 8A-B. If the user selects 'single form' tab 514, the application development system displays computer screen windows as shown in FIGS. 10A-B. If the user selects 'single report' tab 516, the application development system displays a computer screen window as shown in FIG. 12. If the user selects 'main menu' tab 517, the application development system 112 displays computer screen windows as shown in FIGS. 14A-B, illustrating upper and lower portions 1400A and 1400B respectively of a computer screen window. The main menu feature enables a user to create a main menu form for a given application and is described further herein.

A user creates a continuous form by selecting tab 510. Computer screen windows 600A-B are displayed by the application development system 112. Window 600A refers to the upper portion of the continuous form window and window 600B refers to the lower portion of the continuous form window once a user scrolls down from window 600A. The user is presented with various options to select in order to customize the form as desired at step 216. For example, the user is prompted to select a name 602 for the form that refers to the name to be assigned to this form in the database 114. The user also assigns a name 604 for the form's query. The application development system 112 creates a new query for the form using this name 604. The user is also prompted to select an option "is this form read only" 606, which if checked, indicates that users will not be allowed to add, edit, or delete data in the form. If the user does not select this option 606, then the user may further specify whether adds are allowed 608 or whether deletes are allowed 610. An option 'caption for form' 612 specifies a descriptive phrase that will be used as both the form's caption as well as for a label to be placed in the upper-left corner in the form's header section. If desired, a user may include command buttons in the header area such as exit 614, save 616, undo 618, and print preview 620. An option 624 exists that enables the user to click on column heads to sort data.

The user is also prompted to check a filter box 626 if it is desired that the form created allows users to search for selected data fields using a filter. Filtering restricts the number of records (or rows) displayed for those records which values match the values specified by the user in the filter. If this box 626 is checked, the user then selects which fields are enabled for the filtering function via a subwindow 628 in window 600.

Figure 11:
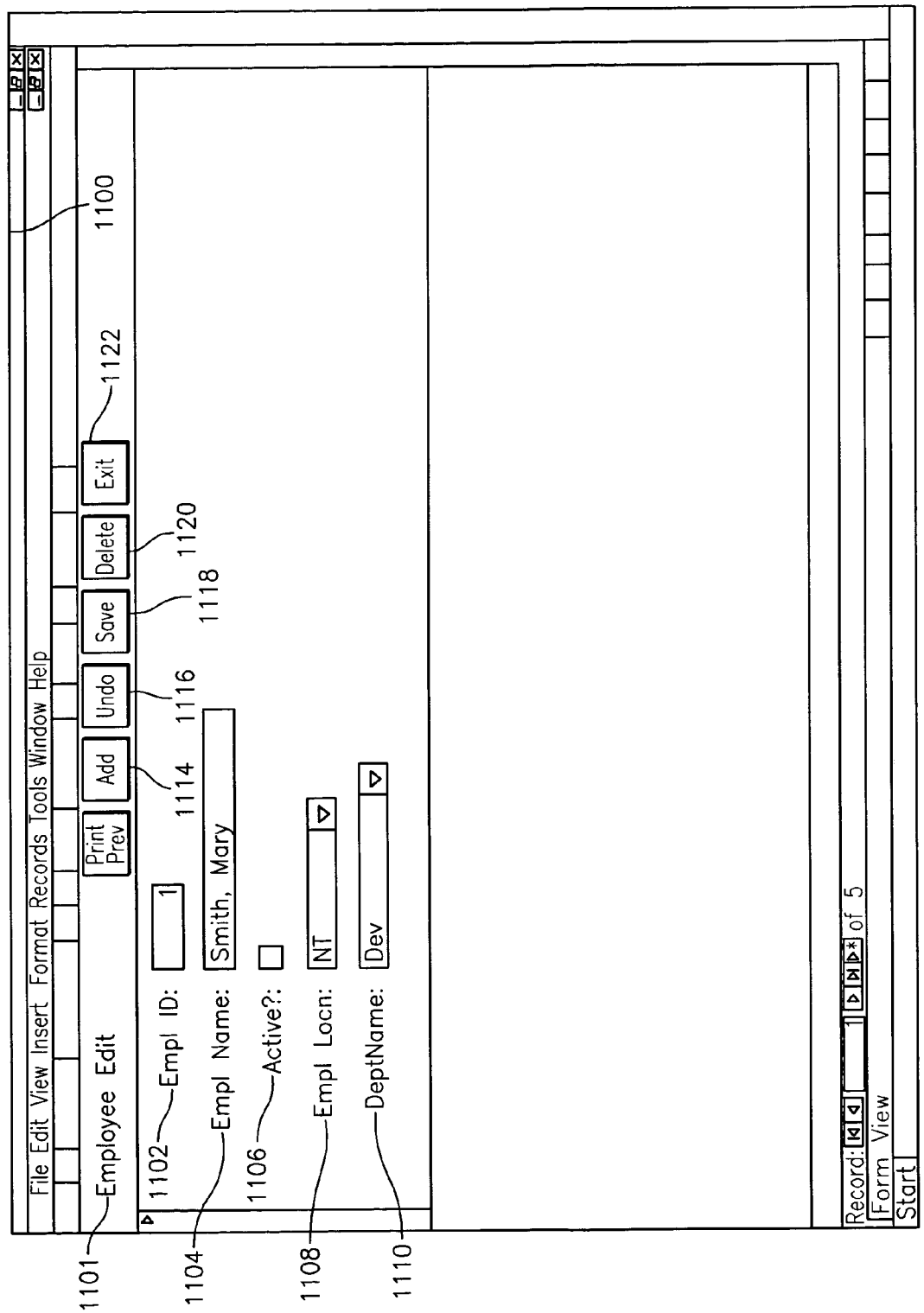
FIG. 11 is a computer screen window provided by the application development system illustrating a sample single form created via the computer screen window of FIGS. 10A-B in exemplary embodiments.

The continuous form feature also enables a user to specify detail area options including a GO command 632. The continuous form displays a limited amount of data on records. In order to see all of the fields for a record associated with a continuous form, a user may want to open a single form and display that record. If the user selects the "Go" feature, the resulting form will include a command button, labeled "Go" that appears to the left of the data on each row. A sample continuous form in shown in window 700 of FIG. 7. Using that form (e.g., from window 700), the user selects a record (row) of interest, then clicks the "Go" command button 716 on that row. The continuous form will automatically open the specified form (presumably a single form similar to 1100 shown in FIG. 11) and will display all of the data for that record. The user selects which field to use to match 634 in the form to be opened. This may be a key field, such as EmployeeID. The user specifies the name of the form 636 to be opened by either selecting the name of an existing form or keying the name of a form that will be created by the user at a future time.

The user may also opt to show record selectors 638 at the left of each row. On a form previously created by database management application 110, a user may elect to display a record selector, which is a gray bar running along the left margin of the screen. Normally the record selector displays a black arrow. But if the user is adding a record or has changed any data in an existing record, the black arrow changes to a pencil. When the 'add' or 'modify' is completed by doing a 'save' or an 'undo' function, the pencil changes back to the arrow. The user may click on the option box 638 to have the record selector displayed in the resulting form.

Application development system 112 also enables a user to customize footer area options by selecting one or more of boxes 640-644. If box 640 is selected, the created form will provide a count of all records displayed on the form. Box 641 enables a user to select the specific field that will be used as a basis for the count. If box 642 is selected, the created form will display a sum of values of records for any numeric-based field. The specific field used as a basis for the count is entered in box 643. The user may also select an option 644 that results in the display of navigation buttons on the bottom of the form.

Figure 7:
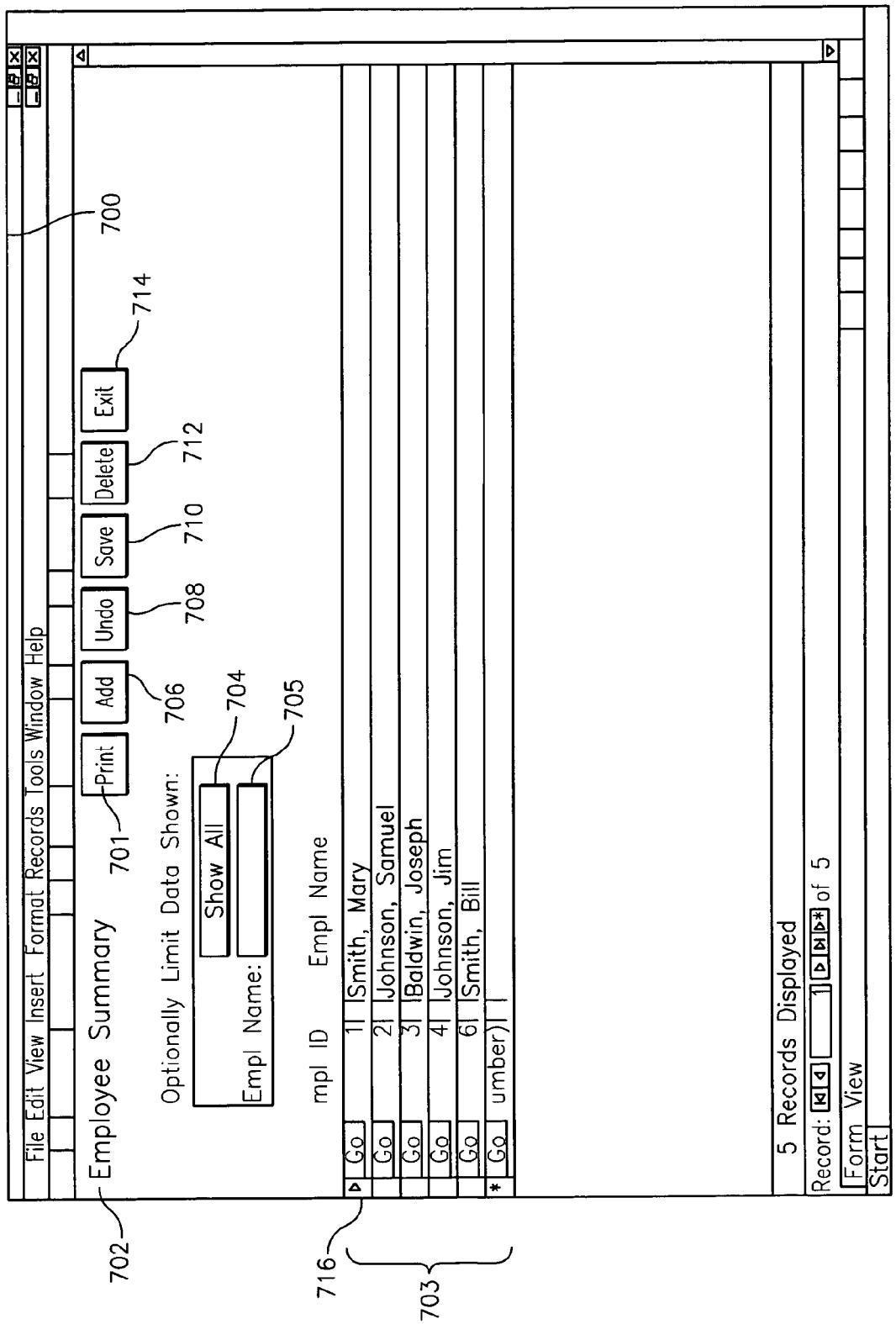
FIG. 7 is a computer screen window provided by the application development system illustrating a sample continuous form created via the computer screen window of FIGS. 6A-B in exemplary embodiments.

Other detail properties may be customized by the user via subwindow 630. Subwindow 630 directs the user to provide a background color for the form, a text color to be used in the form, and other text options as shown in FIGS. 6A-B. Once finished, the user selects 'process' 650 at step 218 and the customized form is created by application development system 112, and presented to the user at step 220. A sample continuous form is shown in FIG. 7. The form of computer screen window 700 illustrated in FIG. 7 displays the form title 702 selected by the user and records 703. In the sample form shown in FIG. 7, the continuous form created is entitled "Employee Summary". The user may circumvent the filter defined via options provided in window 600B and expand the amount of data shown in the form by selecting 'show all' button 704. The user may further add a record if permission is authorized via windows 600A-B using add option 706. The user may print a record by using 'print' option 701. A user may also reverse any changes made to a record using 'undo' option 708. A record may be saved via 'save' option 710 or deleted via 'delete' option 712, respectively, and exited using 'exit' option 714. The user may also sort records alphabetically (e.g., by employee name) by clicking on the column heading for that field employee name 705. If the user double-clicks the employee column heading, the records will be sorted in descending order. The application development system 112 enables a user to customize a form with a variety of fields. Using the example form in FIG. 7, the user may structure the form to include additional fields such as employee department, employee type, or other similar categories of data.

Referring back to step 214, if a user selects continuous report option 512, the computer screen windows 800A-B of FIGS. 8A-B are displayed on user system 102. The application development system 112 prompts the user to customize the report as desired at step 216. The user is prompted to select a name for the report 622, illustrated in FIG. 6A. This is the name, that is assigned to this report in the database 114. A name for the report query is also provided by the user. The application development system 112 will create a new query for the report and this is the name that will be assigned to it in the database 114. For example, the user is prompted to enter a caption or heading for the report via field 802. The user then enters a name for the report 622 (e.g., how the report will be filed in a database) via field 804. The user then enters the name to be given to the report query via field 806. Additional customized features include providing a count of records displayed in the report via check box 808 and by entering the field to be used for the count. Additional features include formatting the report text using options 810-811 in a manner similar to that described above with respect to FIGS. 6A-B. Once finished, the user selects 'process' 812 at step 218, and application development system 112 creates the continuous report. A sample continuous report created by application development system 112 is presented to the user at step 220 and is shown in the computer screen window 900 of FIG. 9.

Referring back to step 214, if the user selects the single form option 514, the computer screen windows 1000A-B of FIGS. 10A-B are displayed to user system 102. Windows 1000A-B enable the user to customize the form as desired at step 216. Options are provided similar to those described above with respect to FIGS. 6A-B. Once finished, the user selects 'process' 1004 at step 218 and application development system 112 creates the customized single form and presents it to the user at step 220. A sample customized single form for one employee, Mary Smith, is shown in computer screen window 1100 of FIG. 11.

Window 1100 displays the single form caption 1101, along with fields 1102-1110. The user may add to these fields 1102-1110 by selecting the 'add' option 1114. A field may be modified by selecting the 'undo' option 1116. The user may save or delete a field by selecting the 'save' or 'delete' options 1118 and 1120, respectively. Otherwise, the user exits the single form by selecting 'exit' 1122.

Referring back to step 214, if the user selects the single report option 516, the computer screen window 1200 of FIG. 12A is displayed to user system 102. Window 1200 enables the user to customize the report as desired at step 216 in a manner similar to that described above with respect to FIGS. 10A-B. A sample single report is shown in computer window 1300 of FIG. 13.

Figure 15:
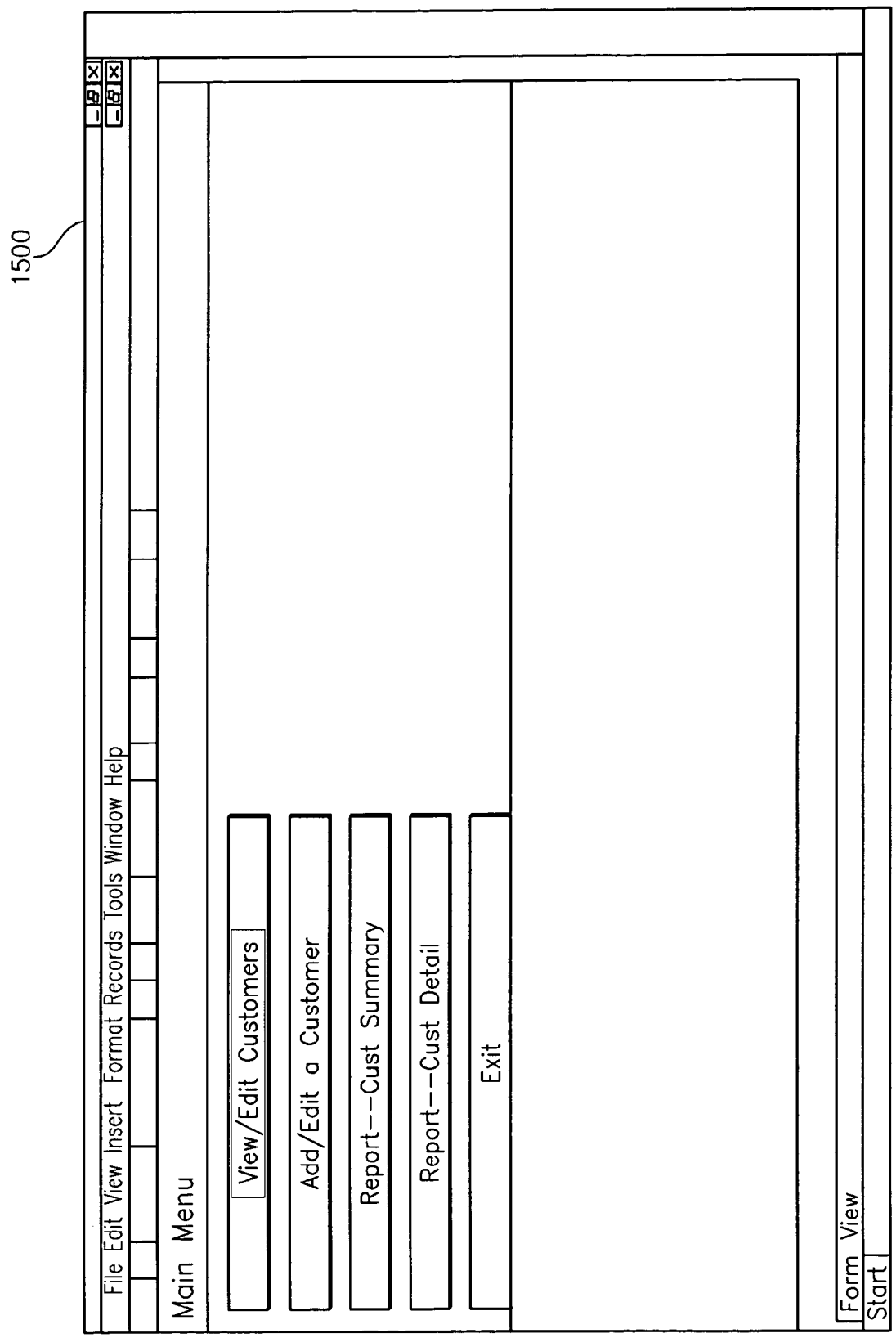
FIG. 15 illustrates a computer screen window provided by the application development system illustrating a sample main menu form created via the computer screen window of FIGS. 14A-B.

The application development system 112 enables a user to create a main menu form that automatically opens when the application is opened. It typically displays a label for the application and command buttons for each main function available to the user. It may also contain a command button the user can click to exit and close the application. The application development system enables a user to create a main menu form for an application, display a title for the application, create command buttons, each of which will open a specified form or report, create a command button to close the application, and specify that the main menu will open automatically when the application is opened. To create a main menu form, the user clicks on main menu tab 517 on window 500. Several options are available. The user selects a name 1402 for the form, a title 1404 for the form, and an option 1406 to automatically open the main menu form when the application opens, if desired. The user may also specify header, footer, and detail section properties as described above. Command buttons may be specified also via columns 1408-1414 provided in window 1400. Command buttons cause a specified form or report to be opened when the command button is selected. A user creates a command button for a main menu by selecting from various options provided via window 1400. The user may select a sequence number that will determine the relative position of the command button within the main menu. This sequence number is entered into column 1408. The user also enters a caption or label for a form/report (e.g., "Employee Summary"), which will appear on the command button. This is provided via column 1410. The user specify whether the command button is to open a form or report in a database by selecting this option from a pull-down box in column 1412. Once this selection is made, the 'name of object to open' pull-down box of column 1414 will be populated with the names of all forms or reports in an associated database. A sample main menu form created by the application development system 112 is shown generally in the computer screen window 1500 of FIG. 15.

As described above, the application development system enables database application users to customize their database applications by providing an interface to an existing database application and expanding its functionality in a way that is convenient and easy to implement. Once the application development system is imported into a database, the application development system then prompts the user to select a table from a list of tables associated with the database and provides assistance in creating new forms and reports for the database, including various searching, sorting, and filtering options.

As described above, the present invention can be embodied in the form of computer-implemented processes and apparatuses for practicing those processes. The present invention can also be embodied in the form of computer program code containing instructions embodied in tangible media, such as floppy diskettes, CD ROMs, hard drives, or any other computer-readable storage medium, wherein, when the computer program code is loaded into and executed by a computer, the computer becomes an apparatus for practicing the invention. The present invention can also be embodied in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an apparatus for practicing the invention. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims.

What is claimed is:

1. A method of expanding a functionality of a database application, the method comprising:
    importing an application development system expanding said functionality of said database application into a database created using said database application, wherein said database created using said database application includes records arranged in a predetermined manner;
    presenting prompts to a user to facilitate selection of records from said database, modification of said records, and arrangement of said records; and
    creating a customized form or report based upon responses to said prompts, wherein said customized form or report includes records from said database that have been selected, modified, and arranged according to said responses, wherein the records modified are modified by the application development system and are not editable by the user, wherein modifying said records includes: selecting fields available for said records; and defining properties of selected fields, and wherein defining properties of selected fields includes defining at least one of: a field name specifying a name assigned to a field when a record or query associated with said field was created; a field type specifying a data type assigned to said field; a field label specifying a user-defined label identifying said field on a single form or a single report; a column head label specifying a user-defined label identifying said field on a continuous form or a continuous report; a print width specifying a width allocated to a value of said field on a form or report; a required during edit property when selected specifying whether a user is permitted to add a new record to a form; and a data source specifying how a field value is determined.

2. The method of claim 1, wherein said records are grouped by at least one of a table and a query.

3. The method of claim 1, wherein said data source includes at least one of:
    a keyed data source indicating that a value for a field will be entered by a user; and
    a system data source indicating that the value for the field will be entered by a system.

4. The method of claim 1, wherein said data source includes at least one of:
    a combo box table/query data source indicating that a value of a field is populated by values from a second table that is different than said table initially associated with said field;
        wherein said user performs at least one of:
            entering a table name for said second table; and
            entering a field name associated with said second table; and
    a combo box value list data source indicating that a value of a field is selectable from a hardcoded list of values and entered by a user.

5. The method of claim 1, wherein:
    one of said form and said report comprises at least one of:
        a continuous report comprising a plurality of records;
        a single report comprising a single record;
        a continuous form comprising a plurality of records; and
        a single form comprising a single record.

6. The method of claim 1, further comprising:
creating a customized main menu form based upon responses to said prompts, said customized main menu form, and said main menu form associated with a user application;
wherein said customized main menu form automatically opens when said user application is opened.

7. The method of claim 1, wherein said arrangement of records includes at least one of:
specifying a filtering preference for at least one of said fields;
displaying a record count using a user-selected field as a basis for said record count; and
circumventing an existing filter.

8. A system expanding a functionality of a database application, the system comprising:
a database application interface interfacing with said database application;
an application development system expanding said functionality of said database application, wherein said application development system is imported, via said database application interface, into a data repository created using said database application and includes records arranged in a predetermined manner, wherein said data repository is communicatively connected to a host system, wherein records arranged in the predetermined manner are stored in the data repository, wherein said data repository includes a database, and wherein said host system includes the application development system and said database application;
a user interface communicatively connected to the host system presenting prompts to a user to facilitate selection of records from said database, modification of said records, and arrangement of said records; and
a report generator presenting a customized form or report based on responses to said prompts, said customized form or report including records from said database selected, modified, and arranged according to responses to said prompts, wherein the records modified are modified by the application development system and are not editable by the user, wherein modifying said records includes: selecting fields available for said records; and defining properties of selected fields, and wherein defining properties of selected fields includes defining at least one of: a field name specifying a name assigned to a field when a record or query associated with said field was created; a field type specifying a data type assigned to said field; a field label specifying a user-defined label identifying said field on a single form or a single report; a column head label specifying a user-defined label identifying said field on a continuous form or a continuous report; a print width specifying a width allocated to a value of said field on a form or report; a required during edit property when selected specifying whether a user is permitted to add a new record to a form; and a data source specifying how a field value is determined.

9. The system of claim 8, wherein said records are grouped by at least one of a table and a query.

10. The system of claim 8, wherein said data source includes at least one of:
a keyed data source indicating that a value for a field will be entered by a user; and
a system data source indicating that the value for the field will be entered by a system.

11. The system of claim 8, wherein said data source includes at least one of:

a combo box table/query data source indicating that a value of a field is populated by values from a second table that is different than said table initially associated with said field;
wherein said user performs at least one of:
entering a table name for said second table; and
entering a field name associated with said second table; and
a combo box value list data source indicating that a value of a field is selectable from a hardcoded list of values and entered by a user.

12. The system of claim 8, wherein:
one of said form said report comprises at least one of:
a continuous report comprising a plurality of records;
a single report comprising a single record;
a continuous form comprising a plurality of records; and
a single form comprising a single record.

13. The system of claim 8, further comprising a main menu form feature creating a customized main menu form based upon responses to said prompts, said customized main menu form being associated with a user application;
wherein said customized main menu form automatically opens when said user application is opened.

14. The system of claim 8, wherein said arrangement of records is specified by at least one of:
a filtering preference for at least one of said fields;
a record count displayed using a user-selected field as a basis for said record count; and
an circumvention feature for an existing filter.

15. A storage medium encoded with machine-readable program code expanding a functionality of a database application via a computer network system, said program code including instructions, performs a method, when executed by a host system, said program code comprising:
importing an application development system expanding said functionality of a database application into a database created using said database application, wherein said database includes records arranged in a predetermined manner;
presenting prompts to a user to facilitate selection of records from said database, modification of said records, and arrangement of said records; and
creating a customized form or report based upon responses to said prompts, wherein said customized form or report includes records from said database that have been selected, modified, and arranged according to said responses, wherein the records modified are modified by the application development system and are not editable by the user, wherein modifying said records includes: selecting fields available for said records; and defining properties of selected fields, and wherein defining properties of selected fields includes defining at least one of: a field name specifying a name assigned to a field when a record or query associated with said field was created; a field type specifying a data type assigned to said field; a field label specifying a user-defined label identifying said field on a single form or a single report; a column head label specifying a user-defined label identifying said field on a continuous form or a continuous report; a print width specifying a width allocated to a value of said field on a form or report; a required during edit property when selected specifying whether a user is permitted to add a new record to a form; and a data source specifying how a field value is determined.

* * * * *